No. 840,473. PATENTED JAN. 8, 1907.
J. BROUSE.
CHAIN HOOK.
APPLICATION FILED JAN. 20, 1906.

WITNESSES
Wm. A. Wyman
J. H. Glen

INVENTOR
J. BROUSE
BY Fred S. Fahrenstock
ATT'Y.

UNITED STATES PATENT OFFICE.

JOSEPH BROUSE, OF RAPIDES DES JOACHIMS, QUEBEC, CANADA.

CHAIN-HOOK.

No. 840,473.      Specification of Letters Patent.      Patented Jan. 8, 1907.

Application filed January 20, 1906. Serial No. 297,084.

*To all whom it may concern:*

Be it known that I, JOSEPH BROUSE, blacksmith, of Rapides des Joachims, in the county of Pontiac, Province of Quebec, Dominion of Canada, have invented certain new and useful Improvements in Chain-Hooks, of which the following is a specification.

My invention relates to improvements in chain-hooks; and the objects of my invention are to devise a cheap, simple, and strong hook for securing together the ends of one or more chains, and more particularly it is intended for joining the ends of a boom-chain in such a manner that it may be readily uncoupled by hand; but it will be impossible for it to uncouple itself, no matter what amount of movement the chain is subjected to; and it consists, essentially, of a shank having a hole in one end thereof to receive the link of one chain and being curved to extend through the link of the joining-chain and then recurved to extend through the link to which it was originally joined and a cross-bar secured to the end of said shank and extending transversely of the link to which the shank is secured, thus preventing the withdrawal therethrough of the end of the shank, but permitting the removal of the link of the joining-chain, the various parts of the device being constructed and arranged in detail, as hereinafter more particularly described.

Figure 1:
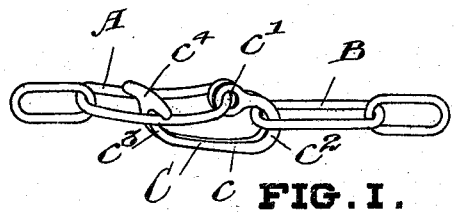
Figure 2:
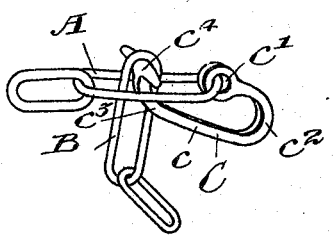
Figure 3:
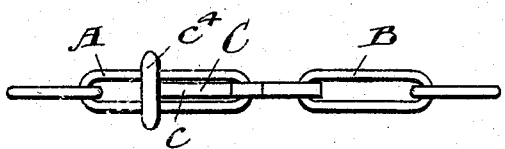
Figure 4:
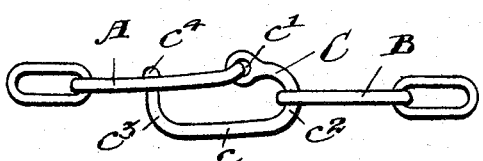

Figure 1 is a perspective view of my chain-hook in position connecting the links of two chains. Fig. 2 is a perspective view showing the method of uncoupling the chains. Fig. 3 is a top view of the chain-hook as shown in Fig. 1. Fig. 4 is a side view of the same.

A and B represent the end links of two separate chains, which are united by means of my improved chain-hook C. The chain-hook consists, essentially, of a shank $c$, having at the end thereof an eye or hole $c'$, through which the link A is adapted to extend and being curved at $c^2$ to extend through the link B and then again recurved at $c^3$ to extend through the link A. To the extreme end of the shank a cross-bar $c^4$ is secured or formed integral with. This cross-bar extends transversely of the link and is adapted to prevent the withdrawal therethrough of the end of the shank $c$. To disengage the link B from the coupling, it is inserted through the link A, as indicated in Fig. 2, and passed over the cross-bar $c^4$ on the end of the hook C. It may then be slipped quite free of the hook and withdrawn through the link A. As will be seen, it will be impossible for the link B to free itself from the hook by any amount of jolting, since not only must it be inserted through the link A, but it must also be given a transverse movement therein to pass over the cross-bar. A chain-hook such as this I have found to be of great use in connecting the boom-chains used in the lumber industry, as in these it has been customary in the past to prevent the hooks from disengaging by binding them with wire or using an equivalent fastening device. This has necessitated a great deal of time and is very unsatisfactory, on account of the wire almost invariably slipping out of position and letting the hook become disengaged. As hereinbefore explained, my hook obviates all these difficulties, as it will be impossible for it to become uncoupled itself, but yet it can be uncoupled by hand in a very short space of time.

While I have described with great particularity of detail one specific embodiment of my invention, yet it will be readily understood that considerable changes might be made therein to accommodate various forms of chains with which my hook would be employed.

What I claim as my invention is—

1. A chain-hook comprising a shank having a hole in one end thereof to receive the link of a chain and being curved to extend through the link of the joining-chain and then recurved to extend through the link to which it was originally joined and means for retaining the end of the recurved shank in position extending through the link of the chain to which it is joined as and for the purpose specified.

2. A chain-hook comprising a shank having a hole in one end thereof to receive the link of a chain and being curved to extend through the link of the joining-chain and then recurved to extend through the link to which it was originally joined and a cross-bar formed integral with the recurved end of the shank and adapted to extend transversely of the link through which the shank extends and thus prevent the withdrawal therethrough of the end of the shank but permit the removal of the link of the joining-chain as and for the purpose specified.

3. A chain-hook comprising a link having a looped member extending at one end beyond the main body of the chain and having the free end extending back through the link and provided with a retaining cross-bar as and for the purpose specified.

Signed at Ottawa, in the county of Carleton, Province of Ontario, this 17th day of January, 1906.

JOSEPH BROUSE.

Witnesses:
 RUSSEL S. SMART,
 S. B. GREENE.